July 30, 1963 — R. C. LENT — 3,099,393
IRRIGATION UNIT
Filed June 14, 1962 — 2 Sheets-Sheet 1
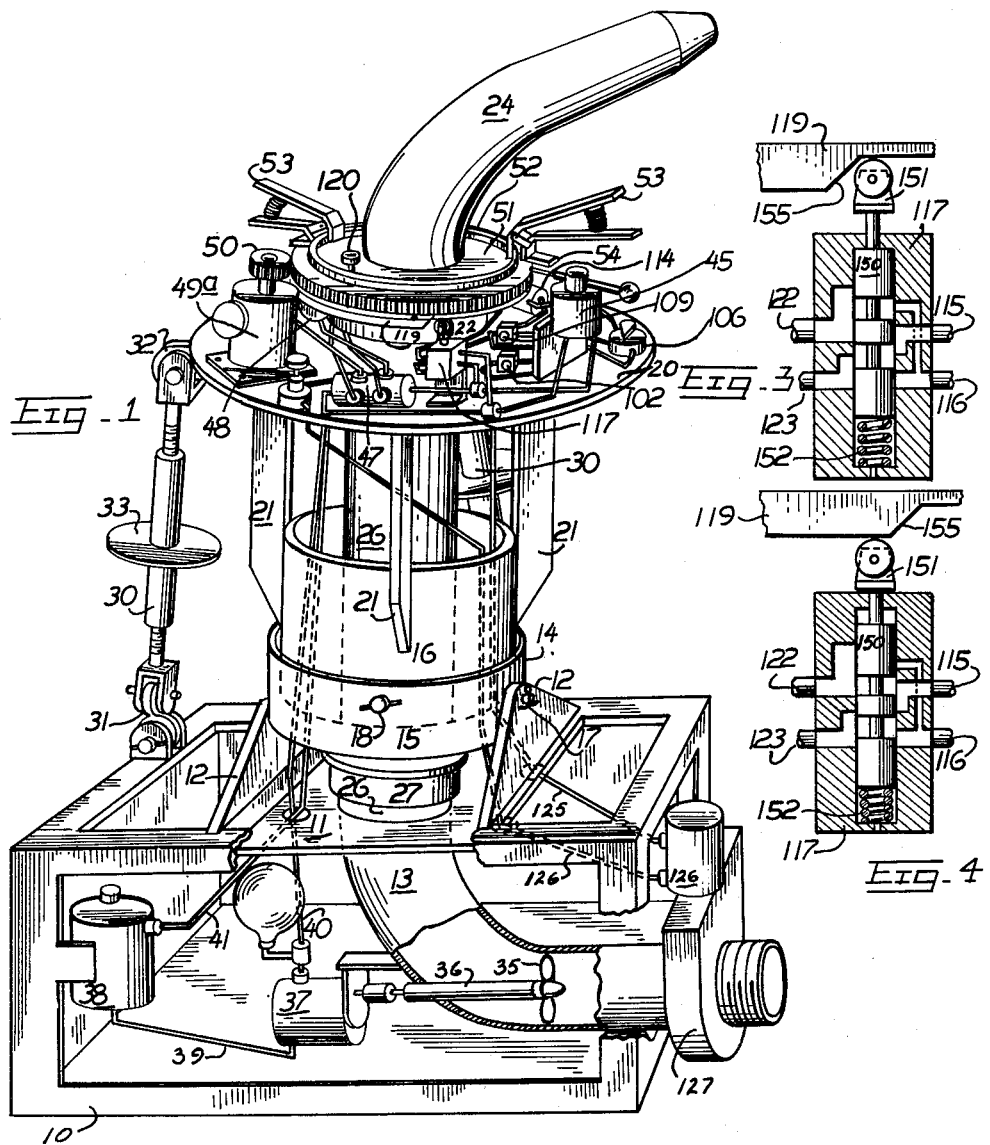
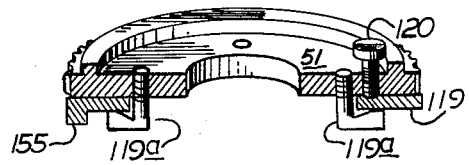
INVENTOR
Ralph C. Lent
BY Mauro & Lewis
ATTORNEYS

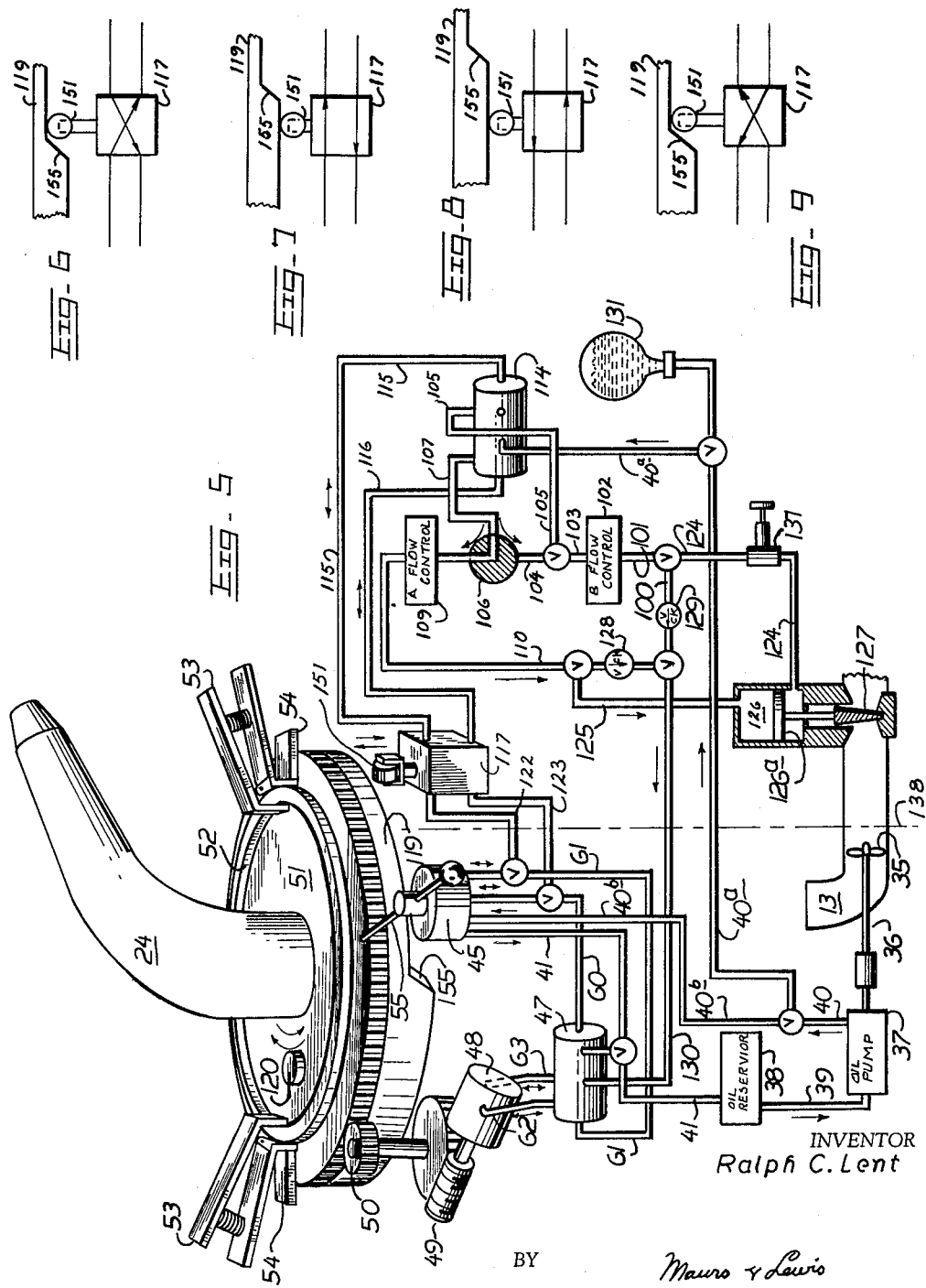

United States Patent Office 3,099,393
Patented July 30, 1963

3,099,393
IRRIGATION UNIT
Ralph C. Lent, Ewa, Hawaii, assignor to Hanawai Manufacturing Company, Limited, Honolulu, Hawaii, a corporation of Hawaii
Filed June 14, 1962, Ser. No. 202,421
15 Claims. (Cl. 239—97)

This invention relates to an improved irrigation unit or sprayer of the overhead type for use in watering fields, plantations, orchards, and the like.

The device of this invention is especially adaptable for use set forth in my prior copending application for patent Ser. No. 79,756 filed December 30, 1960, for "Irrigation Unit," since becoming United States Letters Patent No. 3,047,240, granted July 31, 1962. The present application in a continuation-in-part of said prior copending application.

In said prior application, an irrigation device is disclosed having several novel features, among which is a power-driven spray nozzle mounted for rotational or oscillating movement so that the device may spray in a complete circle or any lesser selected segment thereof. The device also includes means for adjusting the axis of rotation of the spray nozzle to conditions of sloping terrain, and a novel self-contained hydraulic drive. These features are retained and combined with the improvements noted below.

According to the present invention, I have discovered that in the presence of any substantial amount of wind, the spray pattern is disturbed or broken up while the rotating spray is moving in the upwind direction, with the result that the water is deposited in a concentrated area with a high rate of application. This can be undesirable for soils which do not absorb this amount of water. On the other hand, when the rotating spray is traveling in the downwind arc, the best conditions are present for adjusting the nozzle speed to that of the wind, so that a relatively large area may be evenly covered with water.

Therefore, in my improved device, I include additional controls so that the speed of nozzle rotation will be greatly increased during its travel in the upwind arc, and also means for shutting the water off during this arc. Either or both of these controls may be employed at the choice of the operator. Speeding up the nozzle rotation, of course, means that less water is deposited in the upwind arc; in fact, if desired the nozzle speed may be increased during the upwind arc to such an extent that substantially no water is deposited during the upwind arc, so that the device is for all practical purposes spraying in any arcs, all downwind. This would also be true of course, if the water was turned off during the upwind arc.

These controls are found especially useful in areas subject to steady trade winds, blowing at a rate of 5 m.p.h. or more, but their use will often be found desirable when even less wind is present.

The new controls are combined with the controls shown in my prior application and operated along with the hydraulic drive system in such manner that none of the advantages of the prior device is nullified by use of the new controls.

Further features of the invention will be pointed out in connection with the description of the drawing, wherein:

FIG. 1 is a perspective view of the invention, with parts broken away to show internal structure;

FIG. 2 is a sectional detail of the ring gear showing attachment of the speed control cam-ring;

FIGS. 3 and 4 are sectional details showing the four way valve operated by the speed control cam ring;

FIG. 5 is a schematic or diagrammatic plan view of the invention shown in FIG. 1; and FIGS. 6-9 are diagrammatic views showing the various flow directions through hydraulic lines connected to the four-way operating valve.

In these views, elements having reference numerals in two numerals (below 100) are common to my prior copending application noted above. Elements having reference numerals in three numerals (above 100) are additional parts in the combination of the present application.

In FIG. 5, a diagrammatic view of the invention, the former elements are mostly arranged to the left of the dotted line 138, the latter elements are mostly arranged to the right of the dotted line 138.

The device is composed of a base or main frame 10, shown as formed in a skeletal box shape of welded angle iron. The top portion includes platform 11, having a pair of upstanding spaced pivot mounts 12. Fixed in a hole centrally of platform 11 is the intake pipe elbow 13, which is attached to a source of water under pressure, not shown.

Pivoted to mounts 12 is a hollow gimbal joint generally indicated at 14, which consists of a pivoted lower ring 15 in turn supporting a pivoted upper ring 16, the pivot connections being indicated at 17 and 18.

The upper control platform or tilt stand 20 is attached by four supporting legs 21 to the upper ring 16, and carries, through a central aperture, a swivel joint 22 leading to spray nozzle 24, making the latter rotatable. The lower of fixed part of swivel joint 22 is connected to intake pipe elbow 13 by means of a flexible hose section 26 and a suitable hose clamp 27. The flexibility of hose 26 permits the tilt stand 20, swivel joint 22, and nozzle 24 to be tilted in any plane via the gimbal joint 14 with respect to main frame 10.

The means for setting and securing tilt stand 20 and nozzle 24 at the desired pitch or angle consists of a pair of turnbuckles 30 mounted at 90° angles with respect to each other and bridging the space between frame 10 and stand 20. Each turnbuckle 30 is pivotally mounted to frame 10 by a universal joint 31 and to tilt stand 20 by a pivot joint 32. Rotation of the control nuts 33 in the selected direction reduces or enlarges the length of each turnbuckle and hence applies leverage to the control platform 20; alter its pitch or angle in any plane with respect to main flange 10.

The driving and control means will next be described.

The primary source of power for the device is the water power passing into intake pipe 13 from a suitable source, not shown. Mounted in pipe 13 is a propeller 35 whose shaft 36 passes externally of pipe 13 through a fluid tight passage and is connected to a fluid pump 37, which also may be mounted on pipe 13, as shown. Pump 37 is preferably an oil pump operating on a supply of oil from a reservoir 38 through the suction line 39. Pressure oil line 40 and return line 41 lead to the control platform 20, where the remaining control devices are located. Accordingly, the movement of water into pipe 13 actuates propeller 35 which in turn actuates oil pump 37 to force oil into the pressure line 40, as indicated by the flow arrows (FIG. 5). It will be understood that oil lines 40 and 41 are formed with sufficient flexibility to accommodate the tilting of platform 20.

Mounted on the control platform (from right to left, FIG. 1—see also FIG.5) are: three-way selector valve 106, pilot valve 45, a three-way valve 114, a pair of high and low speed flow control valves 109 and 102, a cam-operated four-way valve 117, a four-way pilot-operated control valve 47, an oil driven motor 48, and driving means including a housing 49a for worm reduction gear 49 and mounting a driving pinion 50.

Around the upper periphery of ring gear 51 is mounted an upstanding ring or flange which is termed a stop ring 52 adapted to carry a pair of clamp-like stop members 53 which may be clamped to any selected locations on ring 52. Stop members 53 are spring actuated and provided with ears 54 which are designed to contact with the trip arm 55 of pilot valve 45 during rotation of gear 51, as will be further described.

The remaining parts and connections will be better understood by reference to FIG. 5.

Oil fluid under pressure emerges from oil motor 37 by way of oil line 40 which is branched in two at 40a and 40b. Line 40b leads to pilot valve 45 and a return line 41 leads back to oil reservoir 38. Depending on the setting of pilot valve 45, actuated as above described, oil pressure will be exerted either in line 60 or 61, thus affecting the setting of the hydraulically shiftable spool-type four-way valve 47. Valve 47 in turn determines the direction of flow of oil in lines 62—63 and hence the direction of rotation of oil motor 48. Oil motor 48 drives the ring gear 51 and rotates nozzle 24 mounted therein, via the gear 49 and 50. The speed of rotation depends on the amount of oil flowing into this part of the system via the line 130 entering valve 47.

Returning now to line 40a, this line contains the driving fluid which ultimately reaches valve 47 via line 130. The speed of the oil movement in line 130 is determined by the intervening parts now to be described.

Coupled into line 40a is an accumulator 131 in which gas is trapped and compressed by oil pressure in the line 40a. Accumulator 131 serves to keep driving pressure in the line whenever the gate valve 127 is closed and has turned off the water which drives propeller 35 and pump 37.

Line 40a next leads to a spool type, hydraulically actuated 3-way valve 114, which is shiftable depending on the direction of flow in lines 115 and 116 so that the driving fluid from line 40a is delivered into either line 105 or 107. If the fluid exits through line 107 it passes a 3-way selector control valve 106 (in the setting shown in FIG. 5) into line 108 leading to an "A" flow control valve 109 which can be set to control the amount of oil flow. Fluid leaving valve 109 passes into line 110.

Line 110 passes a one-way check valve at 128 and junctions with line 130. A branch line 125 from line 110 also leads to the top of a driving cylinder 126, thus delivering actuating pressure to piston 126a connected to gate valve 127 mounted in water intake pipe 13. Hence, pressure in line 125 tends to close gate valve 127, cutting off the water flowing to nozzle 24.

If, on the other hand, valve 114 is hydraulically set to deliver fluid from line 40a into line 105, this line, divided into branches 103 and 104, will pass fluid via line 103 into a second or "B" flow control valve 102. (Line 104 leads to the selector valve 106 which is closed to line 104 as shown in FIG. 5.) Valve 102 also may be adjusted to control speed of fluid flow into lines 101—100, the latter having a one-way check valve 129 therein and junctioning with main fluid line 130.

A branch line 124 also leads from line 101 to the lower end of cylinder 126, so that pressure in this line tends to raise gate valve 127. Line 124 is interrupted by a needle valve 137 by which fluid flow in line 124 may be cut off. If this is done when the piston 126a and gate valve 127 are raised, then fluid trapped in the lower part of the cylinder 126 will prevent any fluid pressure in line 125 from actuating piston 126a and again closing gate valve 127.

The condition of adjustment of valve 114 is determined by the direction of fluid pressure in lines 115 and 116. These are, in turn, connected to the four way cam-operated valve 117, as best seen in FIGS. 3 and 4. Valve 117 has a ported spool 150 externally shiftable by a wheeled control arm 151 operating against the pressure of an internal spring 152. Valve 117 is also connected to pilot valve 45 via the lines 122 and 123 which junction with lines 60 and 61, respectively.

Therefore, with control arm 151 of valve 117 extended (FIG. 3), lines 122 and 116 are connected, and lines 123 and 115 are connected, in an X pattern as illustrated in FIGS. 6 and 8. With control arm 151 depressed, as in FIG. 4, lines 122 and 115 are connected, lines 123 and 116 are connected, as shown in FIGS. 7 and 9.

From FIGS. 6–9 it will thus be understood that the adjustment of control valve 114 and the flow direction in lines 115—116 which determines its setting, may be determined by two factors: the position of control arm 151, or, the flow direction in lines 122—123 in turn regulated or reversed by the setting of pilot valve 45.

It will also be understood from the foregoing that the term "flow" as used, implies the application of pressure in the various lines.

The control arm 151 of valve 117, is actuated by a ring 119, which can be conveniently called a "wind" ring, which as seen in FIG. 2, is of the approximate diameter of ring gear 51 and mounted on its underside for setting relative thereto by a series of hooks 119a. Ring 119 can be locked in the desired position with respect to ring gear 51 by adjustment of set screw 120.

Wind ring 119 operates as a cam by reason of having a segment of 180° which is thicker than the remainder of the ring and which is indicated at 155. Valve 117 being mounted so that the wheeled control arm 151 is spring urged into contact with the base of ring 119, control arm 151 will be depressed in making contact with the cam segment 155, and will remain depressed for one-half or 180° revolution of ring 119.

*Operation*

The device is first located in the field to be irrigated and connected with a source of water under pressure. Oil pump 37 will then start to deliver pressure into the system, gate valve 127 being up. The tilt of tilt stand 20 may be adjusted to terrain conditions by means of turnbuckles 30.

In the first example, it will be assumed that a circular pattern could be watered except for the presence of a steady wind which breaks up the spray in the upwind segment of nozzle rotation and hence makes watering in this arc undesirable.

Under this first condition, reversal of nozzle rotation is not needed, so that stops 53 are removed from the machine, meaning that pilot valve 45 will not be tripped, and that nozzle 24 will rotate only in one direction. Next, the nozzle 24 is aimed directly into the wind, or downwind, and wind ring 119 is adjusted and locked relative to gear ring 51 and nozzle 24 by set screw 120 so that control arm 151 will be depressed by the cam segment 155 at the point when the nozzle reaches the downwind arc, and during the upwind arc, control arm 151 will be raised.

With pilot valve manually adjusted so that fluid flow and pressure is to the right in line 122, and to the left in line 123, in the downwind arc, control lever 151 being in the raised position, flow is to the right in line 116 (FIG. 3), and the internal spool in valve 114 is shifted right to connect driving fluid in line 40a with line 105. The fluid driving pressure thus passes through "B" flow control valve 102 into lines 101—129—130, which valve is adjusted at a low setting to keep motor 48 at a relatively low speed, so as, for example to keep the nozzle rotating at a speed adjusting the spray to the wind speed. In this 180° downwind arc, therefore, a very even widespread pattern is made possible, with every advantage taken of the wind direction. In this sector also, pressure into line 124 will maintain gate valve 127 in the open position.

When nozzle 24 next turns into the upwind sector, the cam segment 155 will depress control arm 151 for the remaining 180° of the circle. This causes a reversal of flow and pressure in lines 115 and 116 compared to that described above, as noted for FIG. 4. Fluid flow and pressure to the right in line 115 will reverse the setting of valve 114 and deliver fluid flow from line 40a into lines 107—108 via selector valve 106. The "A" flow control valve 109 can then be opened to a relatively wide setting by comparison to that of "B" flow control valve 102 allowing a greatly increased fluid flow into line 130. This, in turn, delivers fluid at a faster rate to the motor 48 which in turn rotates nozzle 24 much faster.

At the same time, if valve 137 is open, fluid pressure in line 124 will close gate valve 127, cutting water flow off entirely in the upwind arc of the nozzle. If this occurs, accumulator 131 operates to drive the system until gate valve 127 opens again for the downward stage.

A second condition may arise where it is desired not to shut off the water in the upwind arc. Or, conditions of water hammer or the like may make it desirable not to interrupt the water flow by shutting off the water at valve 127. In this event, needle valve 137 is shut while gate valve 127 is raised. Then nozzle 24 can be regulated to make a very quick transition through the upwind arc, while delivering water, the speed of the nozzle determining this amount.

A third condition may arise when the device is set to water the side of a field in a 180° sector, 90° of which is in the upwind direction and 90° of which is in the downwind direction, for example.

Under these conditions the device may be set to oscillate the nozzle in this arc by use of the stops 53. These are applied to the flange 52 at suitable positions to reverse the nozzle rotation at the proper time to water only the aforesaid 180° arc. Each time pilot valve 45 is tripped, motor 48 is reversed through the shifting of valve 47, and at the same time flow in lines 122—123 is also reversed by valve 45. This action counteracts the setting and its effect of valve 117. Accordingly, the same slow setting will occur for the downwind 90° sector and the same speedup will occur in the upwind 90° sector. Gate valve 127 can be operated or not, as before.

A fourth condition may rise, where a circular pattern is wanted, and no wind is present. Then, selector valve 106 is turned to connect lines 107 and 104, line 108 to "A" control valve 109 being thus shut out of the system. With this setting, "B" flow control valve 102 controls speed of fluid flow to the motor and hence speed of nozzle rotation for the entire 360° thereof regardless of the setting of valve 114.

For a fifth condition, if less than a circle is to be watered, and there is no wind, the controls are left in the above condition, and the pilot valve again set to reversing the nozzle at the termini of the selected arc.

Operating conditions may arise other than those described above. But it should be clear from the above examples that the reversing means controlled by stops 53 and pilot valve 45 make it possible to oscillate the nozzle in any selected sector of large or small degree (a few degrees or 360°), and that, depending on this setting, whatever portion or portions of the selected sector happen to fall in the upwind direction may be covered by the nozzle moving at relatively high speed, with or without water cut-off.

In illustrating my device I have shown the power source as water pressure in the intake line. Oil pump 37 may be otherwise driven, as by a suitable engine connected thereto.

What is claimed is:

1. An irrigation device including in combination, a base member, a spray nozzle rotatively mounted on said base member, a water intake adapted for attachment to a source of water and connected to said spray nozzle, driving means connected to said spray nozzle for rotating said nozzle, and control means operatively connected to said nozzle and to said driving means, said control means being preadjustable with respect to prevailing wind direction in order to impart acceleration of movement to said movement of said nozzle whenever said nozzle movement passes into any upwind sector during rotation in whichever direction said nozzle is being motivated.

2. An irrigation device including in combination, a base member, a spray nozzle rotatively mounted on said base member, a water intake adapted for attachment to a source of water and connected to said spray nozzle, driving means connected to said spray nozzle for rotating said nozzle, reversing means operatively connected to said driving means, said reversing means being preadjustable to cause reversal of the rotary movement of said nozzle within the limits of any selected arc, and control means operatively connected to said nozzle and to said driving means, said control means being preadjustable with respect to prevailing wind direction to impart acceleration of the movement of said nozzle whenever said nozzle movement passes into an upwind segment of said selected arc of nozzle rotation.

3. An irrigation device, including in combination, a base member, a spray nozzle rotatively mounted on said base member, a water intake adapted for attachment to a source of water and connected to said spray nozzle, driving means connected to said spray nozzle for rotating said nozzle, reversing means operatively connected to said driving means, said reversing means being preadjustable to cause reversal of the rotary movement of said nozzle within the limits of any selected arc, and control means operatively connected to said nozzle and to said driving means, said control means being preadjustable to impart relatively fast and relatively slow speeds of nozzle movement during any selected segments of unidirectional movement of the nozzle within said selected arc and conversely to impart relatively slow and relatively fast speeds of nozzle movement during return movement of said nozzle through said same selected segments of said arc, said return movement being caused by operation of said reversing means.

4. The invention according to claim 1, wherein the control means includes means for adjusting the speed of nozzle rotation to wind speed during any downwind movement of said nozzle.

5. The invention according to claim 2, wherein the control means includes means for adjusting the speed of nozzle rotation to wind speed during any downwind movement of said nozzle.

6. The invention according to claim 1, further including means for closing said water intake operatively connected with said control means and actuable simultaneously whenever said nozzle is accelerated in the upwind direction.

7. The invention according to claim 2, further including means for closing said water intake operatively connected with said control means and actuable simultaneously whenever said nozzle is accelerated in the upwind direction.

8. The invention according to claim 3, further including means for closing the water intake operatively connected to said control means and actuable simultaneously whenever said nozzle passes through any relatively fast segment of movement.

9. An irrigation device including in combination, a base member, a spray nozzle rotatively mounted on said base member, a water intake adapted for attachment to a source of water and connected to said nozzle, reversible driving means operatively connected to said spray nozzle for rotating said nozzle, speed control means connected to said driving means, said speed control means being preadjustable to operate said driving means at two relatively different speeds during passage of the nozzle through different selected segments of an arc of rotation, and reversing means connected to said driving means, said reversing means being preadjustable to confine the arc of rotation of the nozzle within preselected limits, said reversing means being interconnected with said speed control means so that actuation of the former to reverse the driving means also reverses the speed setting of the speed control means.

10. An irrigation device including in combination, a base member, a spray nozzle rotatively mounted on said base member, a water intake adapted for attachment to a source of water under pressure and connected to said spray nozzle, driving means connected to said spray nozzle for rotating said nozzle, said driving means including a reversible fluid-driven motor and fluid lines connecting said motor to said source of fluid under pressure, speed control valve means connected in said fluid lines, said valve means being in preadjustable capability to control the relative amounts of fluid flow delivered to said motor to operate the latter at two relatively different preselected speeds during preselected segments of an arc of rotation of said nozzle, and reversing valve means also connected in said fluid lines, said reversing valve means being preadjustable to reverse fluid flow to said motor and the direction of operation thereof to confine the arc of rotation of the nozzle to preselected limits, the reversing valve means and the speed control valve means being interconnected so that actuation of the former to reverse the motor also reverses the speed setting of the latter speed control valve means.

11. The device according to claim 10, wherein the source of fluid under pressure for driving said motor includes a fluid pump connected to said fluid lines, said pump being powered by mechanical driving means.

12. The invention according to claim 10, wherein the speed control valve means is actuated by a cam member carried by said nozzle and rotatable therewith, said cam member being adjustable with respect to the direction in which said nozzle is pointed.

13. The invention according to claim 10, wherein the reversing valve means includes a valve which is mechanically shiftable by means of a trip arm mounted externally on said valve, said nozzle carrying a ring member rotatable therewith, said ring member carrying trip members adjustable relative to the position of said nozzle, said valve being mounted on the device in position for actuation of said trip arm by said trip members.

14. An irrigation device including in combination, a base member, a spray nozzle rotatively mounted on said base member, a water intake adapted for attachment to a source of water under pressure and connected to said nozzle, a reversible fluid-driven motor mechanically connected to said nozzle for rotation thereof, a fluid line system connecting said motor with a source of fluid under pressure, said fluid line system including therein an hydraulically operated reversing valve containing means reversing fluid flow to said motor, a mechanically operated pilot valve sensitive to selected positions of said spray nozzle and hydraulically connected to said reversing valve and actuating the latter at said selected positions, and means for controlling the delivery speed of the fluid under pressure entering said reversing valve and said motor, said controlling means being connected in said fluid line system between said reversing valve and said source of fluid under pressure, and including an hydraulically shiftable control valve delivering said fluid into one of a pair of branch fluid lines leading to said reversing valve, said branch fluid lines each having a valve therein adjusting fluid flow to predetermined rates, said hydraulically shiftable control valve being operated by a mechanically shiftable control valve; a cam device carried by said nozzle rotatable therewith and adjustable relative to the position of said nozzle, said cam device being positioned to actuate said mechanically shiftable control valve at selected positions of said nozzle, the setting of said hydraulically shiftable control valve and the control valves of said branch lines determining the speed of fluid delivery to said reversing valve and to said motor.

15. The invention according to claim 14, wherein said mechanically operated pilot valve, said mechanically shiftable control valve and said hydraulically shiftable control valve are interconnected by fluid lines in such manner that actuation of the pilot valve reverses the setting of the hydraulically shiftable control valve.

References Cited in the file of this patent
UNITED STATES PATENTS

| | | |
|---|---|---|
| 2,601,559 | Riblet | June 24, 1952 |
| 2,635,007 | Norman | Apr. 14, 1953 |
| 2,805,098 | Hurley | Sept. 3, 1957 |